United States Patent [19]

Sato et al.

[11] Patent Number: 5,386,291
[45] Date of Patent: Jan. 31, 1995

[54] DISPLACEMENT SENSOR INCLUDING A HEAT INSULATING MEMBER PARTITIONING THE MOVING SCALE AND THE SEMICONDUCTOR LASER

[75] Inventors: Soichi Sato; Masaki Tomiya; Tatsuo Itabashi, all of Kawasaki, Japan

[73] Assignee: Mitutoyo Corporation, Tokyo, Japan

[21] Appl. No.: 156,257

[22] Filed: Nov. 22, 1993

[30] Foreign Application Priority Data

Nov. 25, 1992 [JP] Japan .................. 4-314949

[51] Int. Cl.$^6$ ............................... G01B 9/02
[52] U.S. Cl. .................... 356/356; 356/363; 250/237 G
[58] Field of Search ............ 356/356, 363, 231; 250/237 G, 231.13, 231.14

[56] References Cited

U.S. PATENT DOCUMENTS 4,676,645 6/1987 Taniguchi et al. .............. 356/363
4,691,987 9/1987 Ebner et al. ................. 250/227.24
5,283,434 2/1994 Ishizuka et al. .............. 250/237 G

*Primary Examiner*—Samuel A. Turner
*Assistant Examiner*—Robert Kim
*Attorney, Agent, or Firm*—Flynn, Thiel, Boutell & Tanis

[57] ABSTRACT

A displacement sensor is disclosed, which permits a semiconductor laser to be used as a light source with less thermal effects thereof. A spindle 18 with a scale 32 mounted thereon is disposed in a housing 11 or displacement. In the housing are also provided a semiconductor laser 35 for projecting a laser beam onto the scale and a transducer 36 for converting light form the scale into an electric signal. A heat insulation arrangement 41 is provided between the semiconductor laser 35 and the scale 32 to prevent transmission of heat from the semiconductor laser 35 to the scale 32. A heat radiation arrangement for radiating heat from the semiconductor laser 35 to the outside of the housing 11 is mounted in the housing 11. Thus, thermal effects of the semiconductor laser 35 on the scale 32 are reduced, and thus the accuracy of measurement is improved.

15 Claims, 3 Drawing Sheets

DISPLACEMENT SENSOR INCLUDING A HEAT INSULATING MEMBER PARTITIONING THE MOVING SCALE AND THE SEMICONDUCTOR LASER

BACKGROUND OF THE INVENTION

1. FIELD OF THE INVENTION

This invention relates to displacement sensors and, more particularly, to a displacement sensor, which measures linear displacements, angular displacements, etc. optically with a semiconductor laser as a source of light.

2. DESCRIPTION OF THE RELATED ART

In the prior art, there have been displacement sensors for optically measuring linear displacements. One such displacement sensor comprises a housing, a spindle provided therein for displacement in the axial direction, a probe provided at one end of the spindle, and a scale provided at the other end thereof and having an optical lattice extendinc in the direction of displacement. The housing furtheI accommodates a light source for projecting light onto the scale and a photoelectric transducer for converting light from the scale to an electric signal.

In the above displacement sensor, if the scale is subject to thermal expansion and contraction with ambient temperature changes, it will cause variations of the clearance between the scale and photoelectric transducer or cause generation of thermal stress in the scale. In this case, high accuracy measurement can not be obtained.

In the meantime, in the photoelectric displacement detection, it is desirable that the optical signal has high contrast between the brightness and darkness. To attain this, it is desirable to use a semiconductor laser as a source of light. The semiconductor laser, however, generates great heat. Therefore, the scale which is disposed near a semiconductor laser is subject to thermal expansion, thus leading tc errors in the displacement detection and making it impossible to obtain high accuracy measurement.

An object of the invention is to a displacement sensor, which can solve the above problems and permits a great heat generation semiconductor laser to be used as a light source with less thermal effects thereof on the accuracy of measurement.

SUMMARY OF THE INVENTION

A feature of the invention resides in a displacement sensor, which comprises a housing, a displaceable member disposed for displacement in the housing, a scale secured to the displaceable member and having optical lattices, a semiconductor laser disposed in the housing and projecting a laser beam onto the scale, transducer means disposed in the housing for converting light from the scale into an electric signal, and a head insulation arrangement disposed between the semiconductor laser and the scale, the heat insulation arrangement serving to prevent transmission of heat from the semiconductor laser to the scale.

With this structure, the transmission of heat from the semiconductor laser to the scale is reduced by the heat insulation arrangement disposed between the former and the latter, thus reducing thermal effects of the former on the latter.

The heat insulation arrangement may have a structure including a heat insulation member partitioning the interior of the housing into a chamber accommodating the scale and another chamber accommodating the semiconductor laser, a heat insulation cylinder provided on the heat insulation member such that its opposite ends open into the two chambers with the semiconductor laser being oriented in the other chamber at a corresponding end of the heat insulation cylinder, and a heat insulation cover fitted on the corresponding end of the heat insulation cylinder in the above-mentioned one chamber and having a hole with a diameter thereof slightly greater than the diameter of the laser beam emitted from the semiconductor laser. With this arrangement, heat generated from the front face and periphery of the semiconductor laser is blocked by the heat insulation cylinder and heat insulation cover, while heat generated from the back face of the semiconductor laser is blocked by the heat insulation member.

Another feature of the invention is a displacement sensor, which comprises a housing, a displaceable member disposed for displacement in the housing, a scale secured to the displacement member and having optical lattices, a semiconductor laser disposed in the housing and projecting a laser beam onto the scale, transducer means disposed in the housing or converting light from the scale into an electric signal, a heat insulation arrangement disposed between the semiconductor laser and the scale, and a heat radiation arrangement mounted in the housing for causing radiation of heat from the semiconductor laser to the outside of the housing, the heat insulation arrangement serving to prevent transmission of heat from the semiconductor laser to the scale, the heat radiation arrangement serving to cause radiation of heat from the semiconductor laser to the outside of the housing.

With this arrangement, heat generated from the semiconductor laser is blocked by the.heat insulation arrangement provided between the semiconductor laser and the scale, so that it is less transmitted to the scale and mostly radiated by the heat radiation arrangement mounted in the housing to the outside thereof.

The heat radiation arrangement may have a structure including a holding block of electrically conductive heat conductor fitted in contact with the case of the semiconductor laser, a casing of a heat conductor mounted in said housing such that a portion of it is exposed to the outer surface of said housing, and electrically insulating heat conductive grease intervening between the casing and the holding block. In this case, preferably a portion of the casing exposed to the outer surface of the housing is provided with heat radiation fins. Further, the holding block and casing may be made of aluminum. With this arrangement, effective radiation of heat from the semiconductor laser to the outside of the housing is obtainable while providing electric insulation. That is, since the case of the semiconductor laser constitutes an electrode, the electrically insulating heat conductor grease provides electric insulation, while permitting effective radiation of heat from the semiconductor laser to the outside of the housing.

A further feature of the invention is a displacement sensor, which comprises a housing, a displaceable member disposed for displacement in the housing, a scale secured to the displacement member and having optical lattice, a semiconductor laser disposed in the housing and projecting a laser beam onto the scale, transducer means disposed in the housing for converting light from the scale into an electric signal, a heat insulation arrangement disposed between the semiconductor and the scale, a heat radiation arrangement mounted in the housing for causing radiation of heat from the semiconductor laser to the outside of the housing, and a preamplifier disposed near the heat radiation arrangement for amplifying an electric signal from the transducer means, the heat insulation arrangement serving to prevent transmission of heat from the semiconductor laser to the scale, the heat radiation arrangement serving to cause radiation of heat from the semiconductor and also from the preamplifier to the outside of the housing.

With this arrangement, heat generated from the semiconductor laser is blocked by the heat insulation arrangement provided between the semiconductor laser and the scale and is less transmitted to the scale. Further, most of heat is radiated by the heat radiation arrangement mounted in the housing to the outside thereof, thus permitting reduction of thermal effects of the semiconductor laser. Further, heat from the preamplifier can be effectively radiated to the outside of the housing.

DETAILED DESCRIPTION OF THE PREFERRED EMBODIMENT(S)

Figure 1:
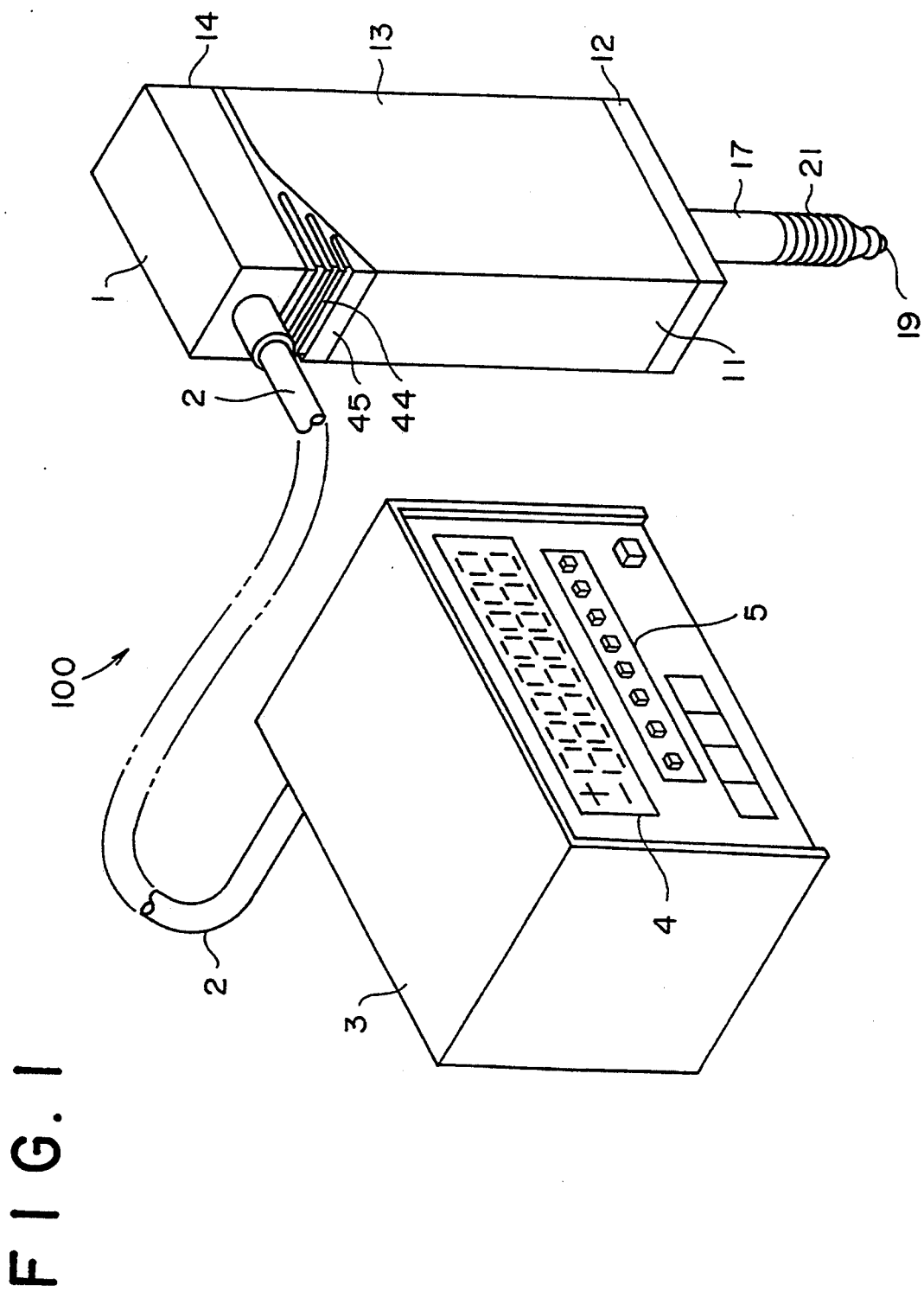
FIG. 1 is a perspective view depicting an embodiment of the invention.

Now, an embodiment of the displacement sensor according to the invention will be described in detail with reference to the drawings. FIG. 1 shows a linear displacement sensor as the embodiment of the invention. The sensor, which is generally designated at 100, comprises a measurement unit 1 and an operational display unit 3, which is connected to the measurement unit 1 via a cable 2 and processes an output signal from the measurement unit 1 in a predetermined manner for digital display. The operational display unit 3 has the front thereof provided with a digital display section 4 and an operational panel section 5.

Figure 2:
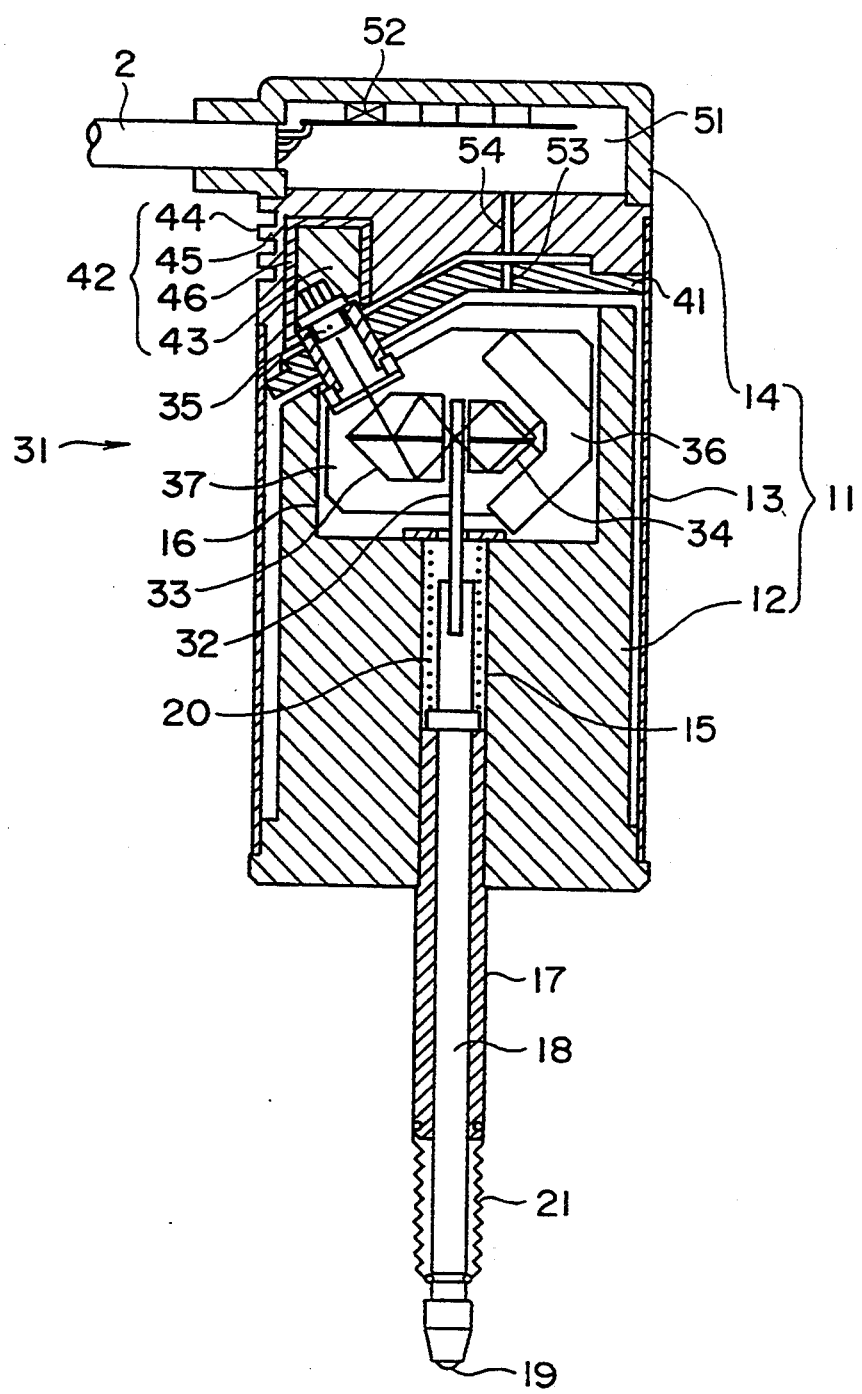
FIG. 2 is a sectional view depicting a measurement unit in the embodiment.

The measurement unit 1, as shown in detail in FIG. 2, has a housing 11, which includes a base frame 12, an angular cylindrical member 13 having a lower end thereof fitted on the base frame 12, and a cover 14 fitted on the upper end of the cylindrical member 13. The base frame 12 has a central through bore 15 in communication with a top cavity or recess 16. In the through bore 15 is inserted a stem 17 of a spindle 18 as a displaceable memberfor linear displacement in the axial direction. The spindle 18 has a spherical probe 19 provided at its free end, and it is spring-biased downward by a spring 20 accommodated in the through bore 15. A bellows-like dust prevention cover 21 which is capable of flexing, is connected between a portion of the spindle 18 adjacent the probe 19 and the stem 17.

Figure 3:
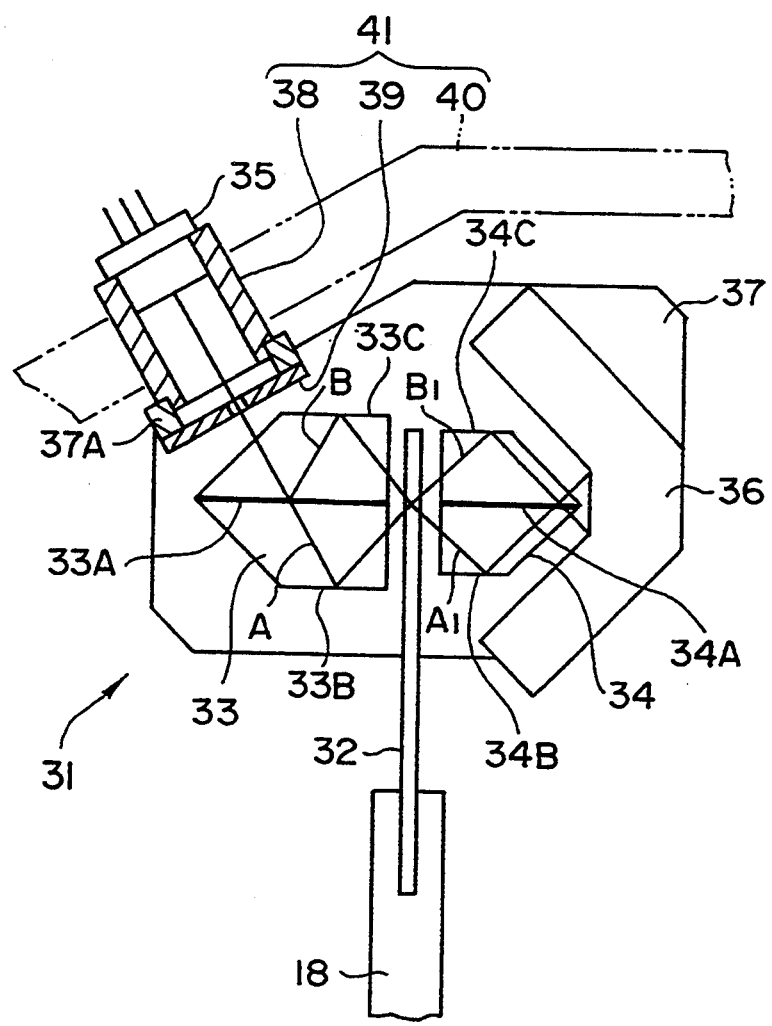
FIG. 3 is an enlarged-scale view depicting an essential part of the measurement unit shown in FIG. 2.

As most clearly shown in FIG. 3, a displacement sensor unit 31 is disposed in the recess 16 for optically detecting the linear displacement of the spindle 18. The displacement sensor unit 31 includes a glass scale 32, which is secured to the other end of the spindle 18 and has diffraction lattices as optical lattices formed at a predetermined pitch in the direction of the displacement, a first and a second prism 33 and 34 facing each other on the opposite sides of the scale 32, a semiconductor laser 35 for emitting a laser beam to be projected onto the scale 32 through the first prism 33, and a transducer 36 as transducing means for transducing light that has been transmitted through the scale 32 and second prism 34 into an electric signal.

The first prism 33 is secured to a base 37 disposed in the recess, and it has a beam splitter 33A for splitting the laser beam from the semiconductor laser 35 into two split beams A and B and two reflecting surfaces 33B and 33C for reflecting the split beams A and B from the beam splitter 33A to be incident on the same diffraction point on the diffraction lattices of the scale 32. The second prism 34 is also secured to the base 37 in the recess 16, and it has reflecting surfaces 34C and 34B for reflecting primary diffraction means A1 and B1 that are generated at the same diffraction point of the scale 32 and a beam splitter 34A for mixing the primary diffraction beams A1 and B1 reflected by the reflecting surfaces 34C and 34B to produce a beam that is incident on the transducer 36.

A heat insulation 41 is interposed between the scale 32 and the semiconductor laser 35. The heat insulation 41 includes a heat insulation member 40, which partitions the interior of the housing 11 into a chamber accommodating the scale 32, prisms 33 and 34 and transducer 36 and another chamber accommodating the semiconductor laser 35, a heat insulation cylinder 38 provided on the heat insulation member 40 and having the ends found on the two chambers, and a heat insulation cover 39 fitted on an end of the heat insulation cylinder 38 on the side of one chamber. The heat insulation cylinder 38 has one end portion on the side of one chamber supported by projections 37A of the base 37 and an end portion on the side of the other chamber accommodatinq the semiconductor laser 35. The heat insulation cover 39 has a hole, which has a diameter slightly greater than the diameter of the laser beam emitted from the semiconductor laser 35. With the above arrangement, heat generated from the front face of the semiconductor laser 35 is blocked by the heat insulation cylinder 38 and heat insulation cover 39, while heat generated from the periphery and the back face of the semiconductor layer 35 is blocked by the heat insulation member 40. Thus, heat is prevented from being transmitted to the scale 32.

As shown in FIG. 2, between the cylindrical member 13 and cover 14, a heat radiation arrangement 42 is provided, which is made of a good heat conductor for radiating heat from the semiconductor laser 35 to the outside of the housing 11. The heat radiation arrangement 42 includes a holding block 43 of an electrically conductive heat conductor (here aluminum), which is fitted on and in contact with the case of the semiconductor layer 35, a casing 45 of a heat conductor (here aluminum), which is interposed between the cylindrical member 13 and cover 14 and has heat radiation fins 44 formed on the outer periphery exposed to the outer surface of the case 11 between the members 13 and 14, and electrically insulating heat conductor grease 46 intervening between the casing 45 and holding block 43.

In the inner space of the cover 14 is accommodated a preamplifier 52 for amplifying the signal from the displacement sensor unit 31. Specifically, the preamplifier 52 is disposed at a position near the heat radiation arrangement 42 and in the chamber on the side of the heat radiation arrangement 42 opposite the semiconductor laser 35. Thus, heat generated from the preamplifier 52 is radiated through the heat radiation arrangement 42 to the outside of the housing 11. The heat insulation member 41 and casing 45 have respective through holes 53 and 54 communicating with a space 51 between the recess 16 and the cover 14.

With the above construction, the laser beam emitted from the semiconductor laser 35 is split by the beam splitter 33A into two split beams A and B, which are reflected by the respective reflecting surfaces 33B and 33C to be incident on the same diffraction point on the diffraction lattices of the scale 32. At the diffraction points, primary diffraction beams A1 and B1 of the two split beams A and B are generated. These diffraction beams A1 and B1 are reflected by the respective refracting surfaces 34B and 34C to be mixed at the beam splitter 34A. More specifically, the reflected beam of the primary diffraction beam A1 and the transmitted beam of the other primary diffraction beam B1 are mixed together, while the transmitted beam of the primary diffraction beam A1 and the reflectedbeam of the other primary diffraction beam B1 are mixed together. These resultant beams are converted in the transducer 36 into an electric signal. The transducer 36 thus provides a sinusoidal wave signal corresponding to the displacement of the scale 32.

When measuring an object, the spindle 18 is raised in FIG. 2 against the biasing force of the spring 20, and then it is lowered to bring the probe 19 into contact with the object. As a result, the displacement of the spindle 18 is detected by the displacement sensor unit 31 and digitally displayed on the digital display section 4 of the operational display unit 3. Thus, a dimension of the object or the like can be determined by reading the displayed value on the digital display section 4.

In the instant embodiment, which uses the semiconductor laser 345 as the light source of the displacement sensor unit 31, the heat insulation arrangement 41 is provided between the semiconductor laser 35 and the scale 32, while the heat radiation member 41 for radiating heat from the semiconductor laser 35 to the outside of the housing 11 is mounted in the housing 11. Thus, heat from the semiconductor laser 35 is less transmitted to the scale 32 owing to the heat insulation arrangement 41 and is mostly radiated by the heat radiation member 42 to the outside of the housing 11. It is thus possible to extremely reduce the thermal effects of heat from the semiconductor laser 35 on the scale 32.

Further, since the heat insulation arrangement 41 includes the heat insulation member 40 for partitioning the interior of the housing 11 into the chamber accommodating the scale 32 and the other chamber accommodating the semiconductor laser 35, the heat insulation cylinder 38 provided on the heat insulation member 40 such that the ends are found on the two chambers with the semiconductor layer 35 located at the end on the side of the other chamber, and the heat insulation cover 39 fitted on an end of the heat insulation chamber 38 on the side of one chamber and having a hole with a diameter thereof slightly greater than the diameter of the laser beam emitted from the semiconductor laser 35, heat generated from the front face and the periphery of the semiconductor laser 35 can be blocked by the heat insulation cylinder 38 and the heat insulation cover 39, while heat generated from the back of the semiconductor laser 35 can be blocked by the heat insulation member 40.

Further, since the heat radiation arrangement 42 includes the holding block 43 of aluminum fitted on the case of the semiconductor laser 35, the casing 45 of aluminum provided between the cylindrical member 13 and cover 14 and having the heat radiation fins 44 formed on the outer periphery between the members 13 and 14, and the electrically insulating heat conductor grease 46 intervening between the casing 45 and holding block 43, it is possible to obtain effective radiation of heat from the semiconductor laser 35 to the outside of the housing 11 while providing electric insulation. In other words, since the case of the semiconductor laser serves as an electrode, the intervening electrically insulating heat conductor grease 46 permits electric insulation, while permitting effective radiation of heat from the semiconductor laser 35 to the outside of the housing 11.

Further, the preamplifier 52 for amplifying the signal from the displacement sensor unit 31 is disposed in the inner space 51 of the cover 14, that is, it is disposed near the heat radiation arrangement 42 and on the side thereof opposite the semiconductor laser 35, heat from it can be radiated through the heat radiation arrangement 42 to the outside of the housing 11.

The above structure of the embodiment of the displacement sensor is by no means limitative. For example, while the displacement sensor unit 31 in the above embodiment has used a scale with diffraction lattices so that diffracted light obtained by projecting a laser beam onto the diffraction lattices is utilized for measuring the displacement of the spindle 18, it is also possible that optical lattices having an alternate arrangement of light transmitting and blocking bands are formed on a main scale and an index scale for conversion of light transmitted or reflected by these scales into an electric signal.

Further, while in the above embodiment the measurement unit 1 is connected via the cable 2 to the operational display unit 3 with the digital display section 4 and operational panel section 5, it is also possible to provide the sections 3 and 4 such that they are integral with the measurement unit 1.

Further, while the above embodiment has concerned with the displacement sensor for detecting the linear displacement of the spindle 18, this is by no means limitative, and the invention is applicable to the detection of the angle of a displaceable member as well.

As shown above, the displacement sensor according to the invention permits a semiconductor laser to be used as a light source with less thermal effects thereof on the accuracy of measurement.

What is claimed is:

1. A displacement sensor, comprising:
a housing,
a displaceable member disposed for displacement in said housing,
a scale secured to said displaceable member and having optical lattices,
a semiconductor laser disposed in said housing and projecting a laser beam onto said scale,
transducer means disposed in said housing for converting light from said scale into an electric signal, and
a heat insulation arrangement disposed between said semiconductor laser and said scale, said heat insulation arrangement serving to prevent transmission of heat from said semiconductor laser to said scale, said heat insulation arrangement including a heat insulation member partitioning the interior of said housing into a first chamber accommodating said scale and a second chamber accommodating said semiconductor laser, a heat insulation cylinder provided on said heat insulation member such that its opposite ends open into said first and second chambers with said semiconductor laser being oriented in said second chamber at a corresponding end of said heat insulation cylinder, and a heat insulation cover fitted on a corresponding end of said heat insulation cylinder in said first chamber and having a hole therethrough which has a diameter slightly greater than the diameter of the laser beam emitted from said semiconductor laser.

2. The displacement sensor according to claim 1, wherein said displaceable member is a spindle disposed in said housing for linear displacement in the axial direction.

3. The displacement sensor according to claim 1, wherein said scale has diffraction lattices arranged in the direction of the displacement.

4. A displacement sensor comprising a housing, a displaceable member disposed for displacement in said housing, scale secured to said displacement member and having optical lattices, a semiconductor laser disposed in said housing and projecting a laser beam onto said scale, transducer means disposed in said housing for converting light from said scale into an electric signal, a heat insulation arrangement disposed between said semiconductor laser and said scale, said heat insulation arrangement including a heat insulation member partitioning the interior of said housing into a first chamber accommodating said scale and a second chamber accommodating said semiconductor laser, a heat insulation cylinder provided on said heat insulation member such that its opposite ends open into said first and second chambers with said semiconductor laser being oriented in said second chamber at a corresponding end of said heat insulation cylinder, and a heat insulation cover fitted on a corresponding end of said heat insulation cylinder in said first chamber and having a hole therethrough which has a diameter slightly greater than the diameter of the laser beam emitted from said semiconductor laser, and a heat radiation arrangement mounted in said housing for causing radiation of heat from said semiconductor laser to the outside of said housing, said heat insulation arrangement serving to prevent transmission of heat from said semiconductor laser to said scale, said heat radiation arrangement serving to cause radiation of heat from said semiconductor laser to the outside of said housing.

5. The displacement sensor according to claim 4, wherein said heat radiation arrangement is mounted in said housing such that it has a portion in contact with the case of said semiconductor laser and another portion exposed on the outer surface of said case.

6. The displacement sensor according to claim 4, wherein said heat radiation arrangement includes a holding block of electrically conductive heat conductor fitted in contact with the case of said semiconductor laser, a casing of a heat conductor mounted in said housing such that a portion of it is exposed to the outer surface of said housing, and electrically insulating heat conductor rease intervening between said casing and said holding block.

7. The displacement sensor according to claim 6, wherein said casing has heat radiation fins provided on a portion of it exposed to the outer surface of said case.

8. The displacement sensor according to claim 7, wherein said holding block and said casing are made of aluminum.

9. The displacement sensor according to claim 6, wherein said displaceable member is a spindle disposed in said housing for linear displacement in the axial direction.

10. The displacement sensor according to claim 6, wherein said scale has diffraction lattices arranged in the direction of the displacement.

11. A displacement sensor, comprising:
a housing,
a displaceable member disposed for displacement in said housing,
a scale secured to said displacement member and having optical lattice,
a semiconductor laser disposed in said housing and projecting a laser beam onto said scale,
transducer means disposed in said housing for converting light from said scale into an electric signal,
a heat insulation arrangement disposed between said semiconductor and said scale, said heat insulation arrangement including a heat insulation member partitioning the interior of said housing into a first chamber accommodating said scale and a second chamber accommodating said semiconductor insulation cylinder provided on said heat insulation member such that its opposite ends open into said first and second chambers with said semiconductor laser being oriented in maid second chamber at a corresponding end of said heat insulation and a heat insulation cover fitted on a corresponding end of said heat insulation cylinder in said first chamber and having a hole therethrough which has a diameter slightly greater than the diameter of the laser beam emitted from said semiconductor laser,
a heat radiation arrangement mounted in said housing for causing radiation of heat from said semiconductor laser to the outside of said housing, and
a preamplifier disposed near said heat radiation arrangement for amplifying an electric signal from said transducer means, said heat insulation arrangement serving to prevent transmission of heat from said semiconductor laser to said scale, said heat radiation arrangement serving to cause radiation of heat from said semiconductor and also from said preamplifier to the outside of said housing.

12. The displacement sensor according to claim 11, wherein said preamplifier is disposed in said housing and in a chamber therein on the side of said heat radiation arrangement opposite said semiconductor laser.

13. The displacement sensor according to claim 11, wherein said heat radiation arrangement includes a holding block of electrically conductive heat conductor fitted in contact with the case of said semiconductor laser, a casing of a heat conductor mounted in said housing such that a portion of it is exposed to the outer surface of said housing, and electrically insulating heat conductor grease intervening between said casing and said holding block, a portion of said casing exposed to the outer surface of said housing being formed with heat radiation fins.

14. The displacement sensor according to claim 13, wherein said displaceable member is a spindle disposed in said housing for linear displacement in the axial direction.

15. The displacement sensor according to claim 14, wherein said scale has diffraction lattices arranged in the direction of the displacement.

* * * * *

UNITED STATES PATENT AND TRADEMARK OFFICE
CERTIFICATE OF CORRECTION

PATENT NO.   : 5 386 291
DATED        : January 31, 1995
INVENTOR(S)  : Soichi SATO et al It is certified that error appears in the above-indentified patent and that said Letters Patent is hereby corrected as shown below:

Column 7, line 19; after "housing," insert ---a---.
Column 7, line 60; change "rease" to ---grease---.
Column 8, line 23; after "semiconductor" insert ---laser, a heat---.
Column 8, line 27; change "maid" to ---said---.
Column 8, line 28; after "insulation" insert ---cylinder,---.

Signed and Sealed this

Eleventh Day of July, 1995

Attest:

BRUCE LEHMAN

Attesting Officer

Commissioner of Patents and Trademarks